(12) United States Patent
Tang et al.

(10) Patent No.: US 11,100,829 B2
(45) Date of Patent: Aug. 24, 2021

(54) CALIBRATING METHOD AND APPARATUS, DISPLAY APPARATUS AND MOBILE TERMINAL

(71) Applicant: BEIJING XIAOMI MOBILE SOFTWARE CO., LTD., Beijing (CN)

(72) Inventors: Lei Tang, Beijing (CN); Jian Li, Beijing (CN); Zhiwen Xu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/896,160

(22) Filed: Jun. 8, 2020

(65) Prior Publication Data
US 2021/0217337 A1 Jul. 15, 2021

(30) Foreign Application Priority Data
Jan. 9, 2020 (CN) .......................... 202010022105.2

(51) Int. Cl.
*G09G 3/00* (2006.01)
*H04M 1/02* (2006.01)
*G06T 7/70* (2017.01)

(52) U.S. Cl.
CPC .............. *G09G 3/007* (2013.01); *G06T 7/70* (2017.01); *H04M 1/0268* (2013.01); *G09G 2320/0693* (2013.01)

(58) Field of Classification Search
CPC .. G09G 3/007; G09G 2320/0693; G06T 7/70; H04M 1/0268
See application file for complete search history.

(56) References Cited

U.S. PATENT DOCUMENTS

2020/0168670 A1* 5/2020 Kim .................. H01L 27/323

FOREIGN PATENT DOCUMENTS

| CN | 108053803 A | * | 5/2018 |
| CN | 108053803 A |   | 5/2018 |

OTHER PUBLICATIONS

OA EP application 20182949.6, dated Nov. 30, 2020.

* cited by examiner

*Primary Examiner* — Alexander Eisen
*Assistant Examiner* — Kebede T Teshome
(74) *Attorney, Agent, or Firm* — Syncoda LLC; Feng Ma

(57) ABSTRACT

A display apparatus includes a fixing component and a display screen having a first pixel region and a second pixel region. An aligning mark line is provided at a joint of the first and second pixel regions. A method for calibrating a display region of the display apparatus includes: capturing a connecting part of the display screen and the fixing component to obtain a first image; determining whether the aligning mark line is shifted with respect to the fixing component; and generating a correction instruction when the aligning mark line is shifted with respect to the fixing component, wherein the correction instruction includes activating a pixel row of the second pixel region where the aligning mark line is shifted with respect to the fixing component to substitute for a pixel row of the first pixel region shifted to a connecting region of the fixing component.

14 Claims, 5 Drawing Sheets

CALIBRATING METHOD AND APPARATUS, DISPLAY APPARATUS AND MOBILE TERMINAL

CROSS-REFERENCE TO RELATED APPLICATIONS

This application claims priority to Chinese Patent Application No. 202010022105.2 filed on Jan. 9, 2020, the disclosure of which is hereby incorporated by reference in its entirety.

BACKGROUND

With the development of display technologies, display apparatuses, such as curved surface screens or 3D display screens, are employed by mobile terminals such mobile phones or tablet computers to improve user experience. For example, active-matrix organic light-emitting diodes (AMOLEDs) may be flexibly bent, which may improve the display effect of a mobile phone when installed on a middle frame of the mobile phone.

SUMMARY

The present disclosure relates to the field of display apparatuses, and more particularly to a calibrating method and apparatus, a display apparatus and a mobile terminal.

Embodiments of the present disclosure provide a calibrating method and apparatus, a display apparatus and a mobile terminal.

According to a first aspect of embodiments of the present disclosure, there is provided a method for calibrating a display region of a display apparatus, wherein the display apparatus includes a fixing component and a display screen connected to the fixing component, the display screen includes a first pixel region and a reserved second pixel region, and an aligning mark line is provided at a joint of the first pixel region and the second pixel region, wherein the method includes:

capturing a connecting part of the display screen and the fixing component to obtain a first image;

determining whether the aligning mark line is shifted with respect to the fixing component according to the first image; and generating a correction instruction when the aligning mark line is shifted with respect to the fixing component, wherein the correction instruction includes activating a pixel row of the second pixel region where the aligning mark line is shifted with respect to the fixing component to substitute for a pixel row of the first pixel region shifted to a connecting region of the fixing component.

According to a second aspect of embodiments of the present disclosure, there is provided a method for calibrating a display region of a display apparatus, wherein the display apparatus includes a fixing component and a display screen connected to the fixing component, the display screen includes a first pixel region and a reserved second pixel region, and an aligning mark line is provided at a joint of the first pixel region and the second pixel region, wherein the method includes:

receiving a correction instruction as described in any embodiment hereinbefore; and activating according to the correction instruction a pixel row of the second pixel region where the aligning mark line is shifted with respect to the fixing component to substitute for a pixel row of the first pixel region shifted to a connecting region of the fixing component.

According to a third aspect of embodiments of the present disclosure, there is provided an apparatus for calibrating a display region of a display apparatus, wherein the display apparatus includes a fixing component and a display screen connected to the fixing component, the display screen includes a first pixel region and a reserved second pixel region, and an aligning mark line is provided at a joint of the first pixel region and the second pixel region, wherein the apparatus includes:

a capturing component, configured to capture a connecting part of the display screen and the fixing component to obtain a first image; and a controller, configured to determine whether the aligning mark line is shifted with respect to the fixing component according to the first image, and to generate a correction instruction when the aligning mark line is shifted with respect to the fixing component, wherein the correction instruction includes activating a pixel row of the second pixel region where the aligning mark line is shifted with respect to the fixing component to substitute for a pixel row of the first pixel region shifted to a connecting region of the fixing component.

According to a fourth aspect of embodiments of the present disclosure, there is provided a display apparatus, including:

a fixing component;

a display screen, connected to the fixing component and including a first pixel region and a reserved second pixel region, and an aligning mark line being provide at a joint of the first pixel region and the second pixel region; and a display controller, configured to receive a correction instruction as described in any embodiment hereinbefore, and to activate according to the correction instruction a pixel row of the second pixel region where the aligning mark line is shifted with respect to the fixing component to substitute for a pixel row of the first pixel region shifted to a connecting region of the fixing component.

According to a fifth aspect of embodiments of the present disclosure, there is provided a mobile terminal, including:

a processor;

a memory for storing instructions executable by the processor;

a middle frame shell; and a display apparatus as described above, wherein the fixing component is installed on the middle frame shell, and the display screen is attached to a surface of the middle frame shell.

It is to be understood that both the foregoing general description and the following detailed description are exemplary and explanatory only and shall not be construed to limit the present disclosure.

REFERENCE NUMERALS

Figure 1:
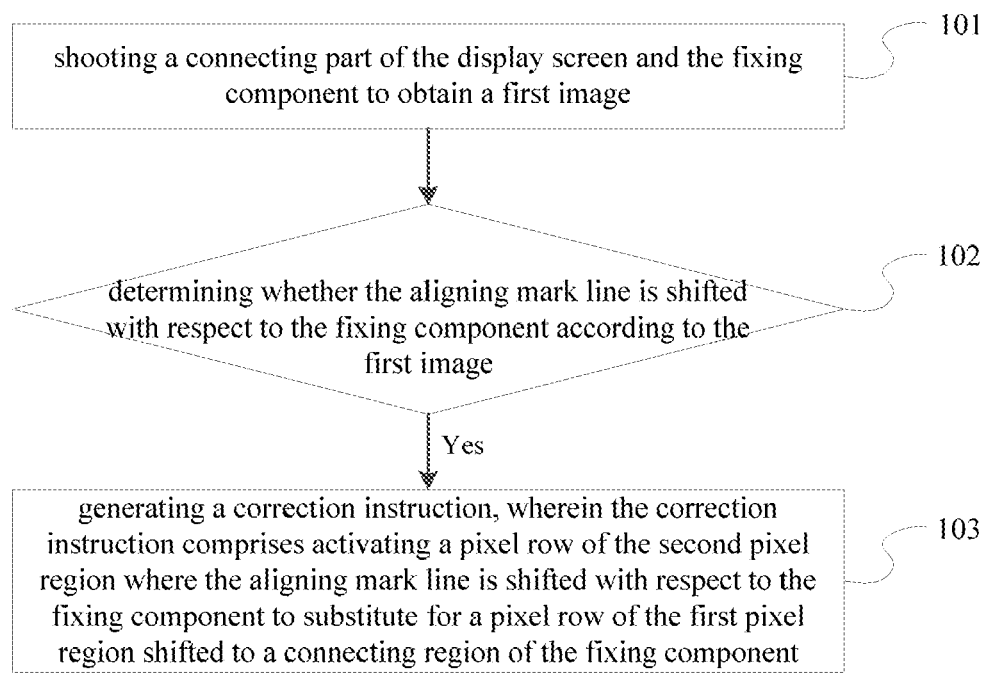
FIG. 1 is a flowchart of a method for calibrating a display region according to some embodiments of the present disclosure.

First pixel region 10; second pixel region 20; third pixel region 21; fourth pixel region 22; aligning mark line 30; first mark line 31; second mark line 32; fixing component 40; first reference line 41; second reference line 42; middle frame shell 50; mobile terminal 60; processing component 61; memory 62; power component 63; multimedia component 64; audio component 65; input/output (I/O) interface 66; sensor component 67; communication component 68; and processer 69.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

The terminology used herein is for the purpose of describing particular embodiments only and is not intended to be limiting of the disclosure. As used in the present disclosure and the appended claims, the singular forms "a," "an," and "the" are intended to include the plural forms as well, unless the context clearly indicates otherwise. It should also be understood that, the term "and/or" as used herein represents and contains any one and all possible combinations of one or more associated listed items.

It should be understood that, although terms such as "first," "second" and "third" may be used herein for describing various information, and such information should not be limited by these terms. These terms are only used for distinguishing the same type of information. For example, the first information may also be called as the second information, and similarly, the second information may also be called as the first information, without departing from the scope of the present disclosure. As used herein, depending on the context, the term "if" may be understood to mean "when" or "upon" or "in response to the determination of" or "according to the determination of" or "in response to the detection of," a precondition stated being true. Similarly, according to the context, the phrase "if it is determined that [a precondition stated is true]" or "if [a precondition stated is true]" or "when [a precondition stated is true]" may be understood to mean "when determining" or "in response to the determination of" or "according to the determination of" or "corresponding to the detection of," a precondition stated being true.

When being bent in three-dimensional (3D) directions or curvedly attached to the middle frame, a flexible screen may form a bent part, which may result in a fitting deviation, such that an image cannot be centered in the display apparatus.

For example, a flexible screen having a screen resolution of 2300*1920 is attached to a middle frame of a mobile phone, in which the flexible screen is bent at both ends of the middle frame, and ends of the flexible screen are fixed to the middle frame by a fixing member. Limited by the existing process, two bent parts of the flexible screen lead to a fitting deviation of ±0.3 to 0.5 mm relative to a front shell. Such a fitting deviation will cause the image displayed by the display screen cannot be centered, especially cause the image displayed by a curved surface screen shifted, after the mobile phone is completely assembled, resulting in poor user experience.

According to a first aspect of embodiments of the present disclosure, there is provided a method for calibrating a display region of a display apparatus, wherein the display apparatus includes a fixing component and a display screen connected to the fixing component, the display screen includes a first pixel region and a reserved second pixel region, and an aligning mark line is provided at a joint of the first pixel region and the second pixel region, wherein the method includes:

capturing a connecting part of the display screen and the fixing component to obtain a first image;

determining whether the aligning mark line is shifted with respect to the fixing component according to the first image; and generating a correction instruction when the aligning mark line is shifted with respect to the fixing component, wherein the correction instruction includes activating a pixel row of the second pixel region where the aligning mark line is shifted with respect to the fixing component to substitute for a pixel row of the first pixel region shifted to a connecting region of the fixing component.

In some embodiments, generating a correction instruction includes:

determining a shift direction of the aligning mark line with respect to the fixing component and a first value of pixel row of the second pixel region in the shift direction;

and outputting a first value of pixel row of the second pixel region to be activated and a first value of pixel row of the first pixel region to be deactivated.

In some embodiments, the second pixel region includes a third pixel region and a fourth pixel region at two opposite sides of the first pixel region, respectively, the aligning mark line includes a first mark line at a joint of the third pixel region and the first pixel region and a second mark line at a joint of the fourth pixel region and the first pixel region; and the correction instruction is generated when it is detected according to the first image that at least one of the first mark line and the second mark line is shifted with respect to the fixing component.

In some embodiments, generating the correction instruction when it is detected according to the first image that at least one of the first mark line and the second mark line is shifted with respect to the fixing component includes:

determining whether at least one of the first mark line and the second mark line is shifted with respect to a preset position of the fixing component;

determining that the first pixel region is not shifted with respect to the fixing component when the first mark line and the second mark line are located at the preset position with respect to the fixing component;

determining that the first pixel region is shifted with respect to the fixing component when at least one of the first mark line and the second mark line is not located at the preset position with respect to the fixing component.

In some embodiments, when at least one of the first mark line and the second mark line is not located at the preset position with respect to the fixing component, the method further includes:

determining that the first pixel region is shifted in a clockwise direction when a distance of the first mark line with respect to the preset position of the fixing component increases;

determining that the first pixel region is shifted in a counterclockwise direction when a distance of the second mark line with respect to the preset position of the fixing component increases.

In some embodiments, when the first mark line and the second mark line are not located at the preset position with respect to the fixing component, the method further includes:

measuring an offset of the first mark line or the second mark line with respect to the fixing component in the first image; and determining according to the offset a value of pixel row of the third pixel region or the fourth pixel region to be activated and a value of pixel row of the first pixel region to be deactivated.

According to a second aspect of embodiments of the present disclosure, there is provided a method for calibrating a display region of a display apparatus, wherein the display apparatus includes a fixing component and a display screen connected to the fixing component, the display screen includes a first pixel region and a reserved second pixel region, and an aligning mark line is provided at a joint of the first pixel region and the second pixel region, wherein the method includes:

receiving a correction instruction as described in any embodiment hereinbefore; and activating according to the correction instruction a pixel row of the second pixel region where the aligning mark line is shifted with respect to the fixing component to substitute for a pixel row of the first pixel region shifted to a connecting region of the fixing component.

In some embodiments, activating according to the correction instruction a pixel row of the second pixel region where the aligning mark line is shifted with respect to the fixing component to substitute for a pixel row of the first pixel region shifted to a connecting region of the fixing component includes:

deactivating a first shifted pixel of the first pixel region shifted to the connecting region of the fixing component and activating a second shifted pixel of the second pixel region shifted out of the connecting region of the fixing component according to the correction instruction, wherein a value of pixel row of the first shifted pixel is equal to a value of pixel row of the second shifted pixel.

In some embodiments, the first pixel region is partially bent.

According to a third aspect of embodiments of the present disclosure, there is provided an apparatus for calibrating a display region of a display apparatus, wherein the display apparatus includes a fixing component and a display screen connected to the fixing component, the display screen includes a first pixel region and a reserved second pixel region, and an aligning mark line is provided at a joint of the first pixel region and the second pixel region, wherein the apparatus includes:

a capturing component, configured to capture a connecting part of the display screen and the fixing component to obtain a first image; and a controller, configured to determine whether the aligning mark line is shifted with respect to the fixing component according to the first image, and to generate a correction instruction when the aligning mark line is shifted with respect to the fixing component, wherein the correction instruction includes activating a pixel row of the second pixel region where the aligning mark line is shifted with respect to the fixing component to substitute for a pixel row of the first pixel region shifted to a connecting region of the fixing component.

In some embodiments, the controller is configured to:

determine a shift direction of the aligning mark line with respect to the fixing component and a first value of pixel row of the second pixel region in the shift direction;

and output a first value of pixel row of the second pixel region to be activated and a first value of pixel row of the first pixel region to be deactivated.

In some embodiments, the second pixel region includes a third pixel region and a fourth pixel region at two opposite sides of the first pixel region, respectively, the aligning mark line includes a first mark line at a joint of the third pixel region and the first pixel region and a second mark line at a joint of the fourth pixel region and the first pixel region, and the correction instruction is generated when the controller detects according to the first image that at least one of the first mark line and the second mark line is shifted with respect to the fixing component.

In some embodiments, the controller is configured to:

determine whether at least one of the first mark line and the second mark line is shifted with respect to a preset position of the fixing component;

determine that the first pixel region is not shifted with respect to the fixing component when the first mark line and the second mark line are located at the preset position with respect to the fixing component;

determine that the first pixel region is shifted with respect to the fixing component when at least one of the first mark line and the second mark line is not located at the preset position with respect to the fixing component.

In some embodiments, the controller is further configured to:

determine that the first pixel region is shifted in a clockwise direction when a distance of the first mark line with respect to the preset position of the fixing component increases;

determine that the first pixel region is shifted in a counterclockwise direction when a distance of the second mark line with respect to the preset position of the fixing component increases.

In some embodiments, the controller is further configured to:

measure an offset of the first mark line or the second mark line with respect to the fixing component in the first image; and determine according to the offset a value of pixel row of the third pixel region or the fourth pixel region to be activated and a value of pixel row of the first pixel region to be deactivated.

According to a fourth aspect of embodiments of the present disclosure, there is provided a display apparatus, including:

a fixing component;

a display screen, connected to the fixing component and including a first pixel region and a reserved second pixel region, and an aligning mark line being provide at a joint of the first pixel region and the second pixel region; and a display controller, configured to receive a correction instruction as described in any embodiment hereinbefore, and to activate according to the correction instruction a pixel row of the second pixel region where the aligning mark line is shifted with respect to the fixing component to substitute for a pixel row of the first pixel region shifted to a connecting region of the fixing component.

In some embodiments, the first pixel region is partially bent, and the second pixel region is located at two ends of the first pixel region and connected to the fixing component.

According to a fifth aspect of embodiments of the present disclosure, there is provided a mobile terminal, including:

a processor;

a memory for storing instructions executable by the processor;

a middle frame shell; and a display apparatus as described above, wherein the fixing component is installed on the middle frame shell, and the display screen is attached to a surface of the middle frame shell.

Various embodiments of the present disclosure can have one or more of the following advantages.

The second pixel region, as an extension region of the display screen reserved for the first pixel region, is activated in partial to substitute for the shifted pixel row of the first pixel region when a fitting deviation occurs to the first pixel region. Therefore, the display region has a good adjusting effect, requirements to a fitting process of the display screen are reduced, the display effect of the display apparatus is improved, and the user experience is good.

Figure 2:
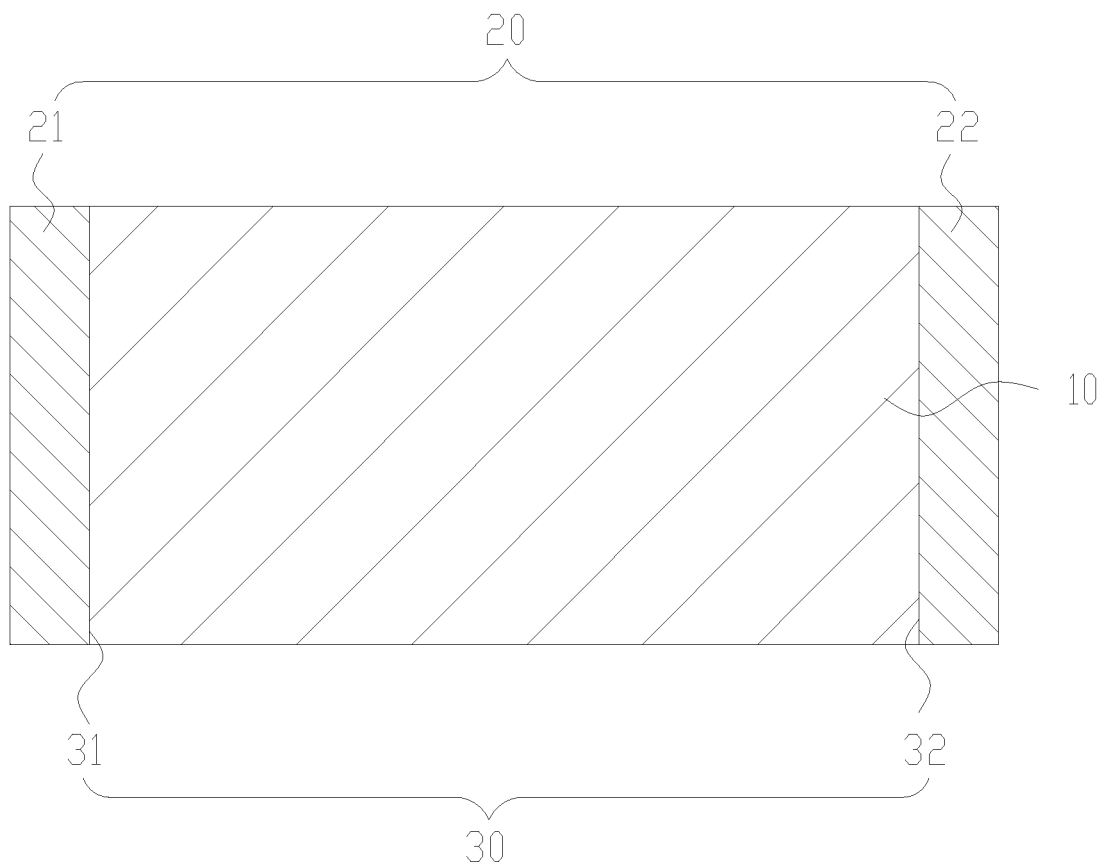
FIG. 2 is a schematic diagram of a display screen in an expanded state according to some embodiments of the present disclosure.
Figure 3:
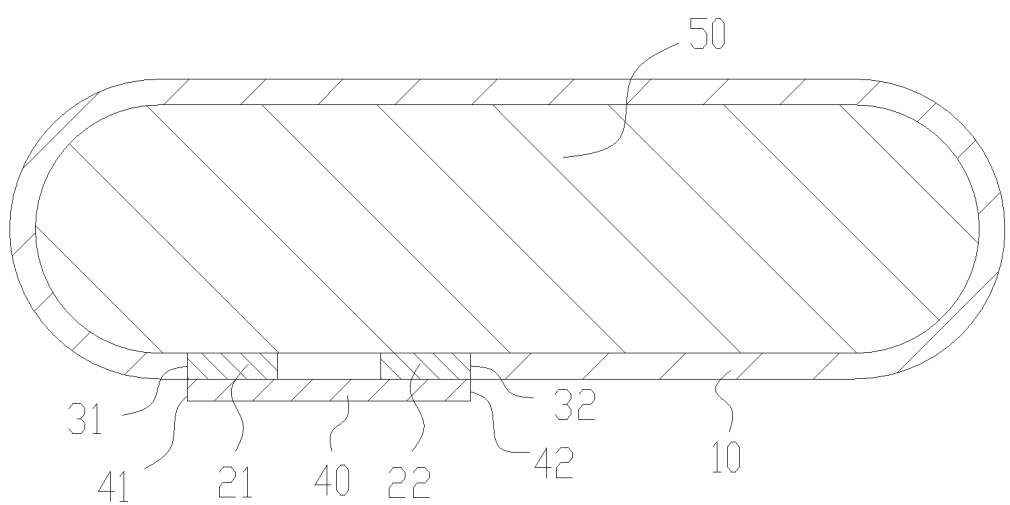
FIG. 3 is a schematic diagram showing that a display screen is attached to a middle frame shell according to some embodiments of the present disclosure.

As illustrated in FIG. 1, FIG. 2, and FIG. 3, embodiments of the present disclosure provide a method for calibrating a display region, which can be used in a factory test to calibrate a display apparatus, so that the display region of the display apparatus can be directly tested and calibrated on a production line or assembly line. The display apparatus includes a fixing component 40 and a display screen connected to the fixing component 40. The display screen includes a first pixel region 10 and a reserved second pixel region 20, and an aligning mark line 30 is provided at a joint of the first pixel region 10 and the second pixel region 20. A screen resolution corresponding to the first pixel region 10 is the display region of the display screen, the second pixel region 20 intersects with the first pixel region 10, and the first pixel region 10 and the second pixel region 20 constitute a screen resolution of the display screen. In an alternative embodiment, the first pixel region 10 is partially bent, so that the display apparatus belongs to a 3D screen or a curved surface screen. For example, the display screen may be a flexible display screen, which is attached to a surface of a middle frame shell 50 to generate a curved surface display effect.

The second pixel region 20 is used as a candidate pixel for correcting the first pixel region 10, and a resolution of the second pixel region 20 may be adjusted according to display screens of different specifications. Both the first pixel region 10 and the second pixel region 20 are formed by the arrangement and combination of sub-pixels in sequence, and each sub-pixel has the same size. The second pixel region 20 is used to correct the shift of the display region caused by an installation deviation of the display screen, so as to make the display region of the display apparatus complete. Accordingly, pixel rows of the second pixel region 20 may be determined according to an installation tolerance of the display screen and the size of the sub-pixel. For example, the pixel rows of the second pixel region 20 may be determined by dividing the installation tolerance by the size of the sub-pixel.

For example, the screen resolution of the display screen may be set as 2340*1920, in which the screen resolution of the first pixel region 10 is 2300*1920, and the screen resolution of the second pixel region 20 is 40*1920, such 40 pixel rows are additionally added with each pixel row has a size of 60 um. Alternatively, the display screen is a flexible display screen, which is attached to the middle frame shell 50 of the mobile terminal. Alternatively, the fixing component 40 is fixed to the middle frame shell 50, and the display screen is fixed to the fixing component 40, so that the display screen is fixed relative to the middle frame shell 50. The aligning mark line 30 is located at the joint of the first pixel region 10 and the second pixel region 20, which makes it convenient to identify the range of the first pixel region 10 and may serve as a reference to determine whether the first pixel region 10 is shifted.

On the production line of the display apparatus, the display screen is fixedly connected to the middle frame shell 50, and ends of the display screen are fixedly connected to the fixing component 40. An apparatus for calibrating a display region of a display apparatus (also referred as "calibrating apparatus" for short) may determine whether the display screen is shifted according to a fitting position of the display screen and the fixing component 40. Embodiments of the present disclosure provide a method for calibrating a display region of a display apparatus (also referred as "calibrating method" for short), which includes the following steps.

At step 101, a connecting part of the display screen and the fixing component 40 is shot to obtain a first image.

At step 102, whether the aligning mark line is shifted with respect to the fixing component is determined according to the first image.

At step 103, a correction instruction is generated when the aligning mark line is shifted with respect to the fixing component. The correction instruction includes activating a pixel row of the second pixel region where the aligning mark line is shifted with respect to the fixing component to substitute for a pixel row of the first pixel region shifted to a connecting region of the fixing component.

The display screen is fixed to the fixing component 40, so that the connecting part of the display screen and the fixing component 40 is fixed, and the aligning mark line 30 is fixed with respect to the connecting part of the fixing component 4. The calibrating apparatus may execute the calibrating method. The calibrating apparatus captures the connecting part of the display screen and the fixing component 40 through a capturing device to obtain the first image, and acquires relative positions of the aligning mark line 30 and the fixing component 40 from the first image. For example, the calibrating apparatus is equipped with a charge coupled device (CCD) micro camera, which is configured to capture the connecting part of the display screen and the fixing component 40 to obtain the first image correspondingly.

In this embodiment, the aligning mark line 30 is a boundary between the first pixel region 10 and the second pixel region 20. By comparing the relative positions of the aligning mark line 30 and the fixing component 40 in the first image, it can be determined whether the aligning mark line 30 is shifted. When a position of the aligning mark line 30 with respect to the fixing component 40 is shifted, indicating that an installation position of the first pixel region 10 with respect to the middle frame shell 50 is shifted, that is, the display region of the display screen is shifted, correction to the display region of the display screen needs to be performed.

When it is determined by the calibrating apparatus according to the first image that the aligning mark line 30 is shifted with respect to the fixing component 40, the calibrating apparatus generates a correction instruction accordingly. The correction instruction includes how to correct the display region of the display screen when the first pixel region 10 is shifted.

Specifically, the correction instruction includes activating a pixel row of the second pixel region 20 where the aligning mark line 30 is shifted with respect to the fixing component 40 to substitute for a pixel row of the first pixel region 10 shifted to a connecting region of the fixing component 40, so as to make the display region of the display screen complete. It should be understood that, the second pixel region 20 is in a dormant state when it is not activated, such that it does not light up and emit light.

When the first pixel region 10 is shifted, part of pixel rows of the first pixel region 10 enters a range covered by the fixing component 40, so that such part of pixel rows is not displayed. At the same time, a corresponding pixel row of the second pixel region 20 intersecting with the first pixel region 10 is also shifted, so that part of pixel rows of the second pixel region 20 enters the display region with the shift of the first pixel region 10, while such part of pixel rows of the second pixel region 20 does not emit light when not activated, resulting in the shift of the display region of the display apparatus.

According to the correction instruction, the display apparatus is able to control the part of pixel rows of the first pixel region 10 entering the range covered by the fixing component 40 to be in the dormant state, and activate the part of pixel rows of the second pixel region 20 entering the display region with the shift of the first pixel region 10 to emit light. As a result, the part of pixel rows of the second pixel region 20 enters an activated state to substitute for the part of pixel rows of the first pixel region 10 entering the dormant state, so as to make the display region of the display apparatus complete and keep the resolution unchanged.

The second pixel region 20, as an extension region of the display screen reserved for the first pixel region 10, is activated in partial to substitute for the shifted pixel row of the first pixel region 10 when a fitting deviation occurs to the first pixel region 10, so as to make the display region of the display screen complete. The calibrating apparatus set on the production line of the display apparatus is able to determine whether the display screen is shifted and output a corresponding correction instruction, so as to enable the display apparatus to correct the shift according to the correction instruction. Therefore, the display region has a good adjusting effect, the requirements to a fitting process of the display screen are reduced, the display effect of the display apparatus is improved, and the user experience is good.

The correction instruction is generated when the calibrating apparatus determines according to the first image that the aligning mark line 30 is shifted with respect to the fixing component 40. Determining whether the aligning mark line 30 is shifted with respect to the fixing component 40 as described at step 102 includes:

determining whether a distance from the aligning mark line 30 to the fixing component 40 is equal to a preset value; and generating the correction instruction when the distance from the aligning mark line 30 to the fixing component 40 is not equal to the preset value.

A reference edge of the fixing component 40 may be a rib, an edge contour line or other linear references of the fixing component 40. The aligning mark line 30 and the reference edge are displayed in the first image, and whether the first pixel region 10 is shifted may be determined by determining the relative positions of the reference edge and the aligning mark line 30, and calculating the distance between the reference edge and the aligning mark line 30. In an alternative embodiment, the preset value is set to be 0, and whether the aligning mark line 30 is shifted with respect to the fixing component 40 may be determined by determining whether the aligning mark line 30 coincides with the reference edge of the fixing component 40, thereby improving the intuitiveness of the shift judgment.

Figure 4:
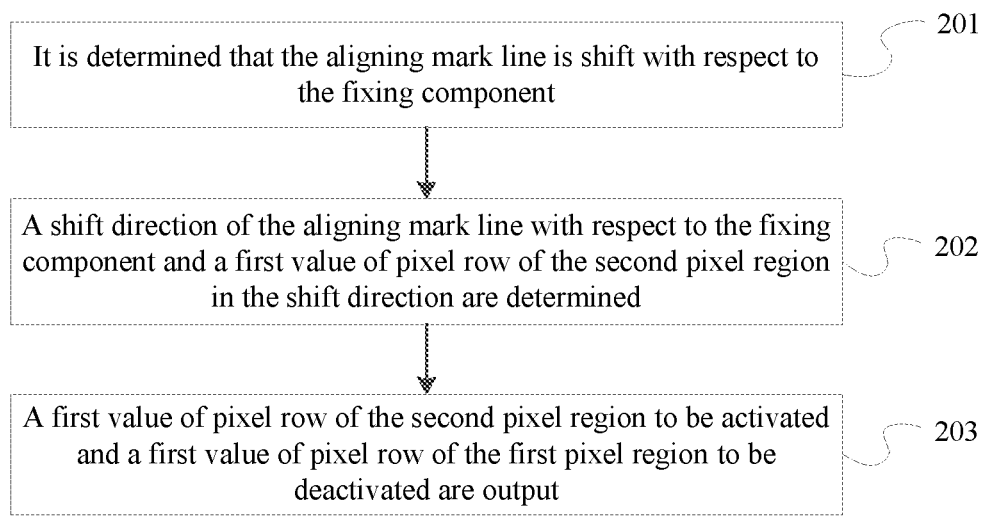
FIG. 4 is a flowchart of detecting according to a first image the shift of an aligning mark line with respect to a fixing component according to some embodiments of the present disclosure.

As illustrated in FIG. 4, if it is determined that the aligning mark line 30 is shifted with respect to the fixing component 40, a shift direction and an offset need to be further determined. Therefore, the calibrating method further includes steps as follows.

At step 201, it is determined that the aligning mark line 30 is shift with respect to the fixing component 40.

At step 202, a shift direction of the aligning mark line 30 with respect to the fixing component 40 and a first value of pixel row of the second pixel region 20 in the shift direction are determined.

At step 203, a first value of pixel row of the second pixel region 20 to be activated and a first value of pixel row of the first pixel region to be deactivated are output.

When the assembly between the display screen and the fixing component 40 is accurate, the distance between the aligning mark line 30 and the reference edge is the preset value, and in such a case, the distance between the aligning mark line 30 and the reference edge may be acquired by the measurement or calculation based on the first image. When the aligning mark line 30 is shift with respect to the fixing component 40, an actual distance between the aligning mark line 30 and the reference edge may also be acquired by the measurement or calculation based on the first image. By comparing the actual distance with the preset value, the shift direction and the first value of pixel row in the shift direction may be acquired, in which the first value may be a ratio of an offset between the aligning mark line 30 and the fixing component 40 in the first image to the pixel size.

In this embodiment, when a difference between the actual distance from the aligning mark line 30 to the reference edge and the preset value is positive, it is determined that the first pixel region 10 is shifted in a first direction. When the difference between the actual distance from the aligning mark line 30 to the reference edge and the preset value is negative, it is determined that the first pixel region 10 is shifted in a second direction. The difference between the actual distance and the preset value is the value of the shifted pixel row.

In an alternative embodiment, when the preset value is 0, i.e., the aligning mark line 30 coincides with the reference edge, it indicates that the display screen is assembled to a preset position. When the aligning mark line 30 appears in the first image and coincides with the reference edge, it indicates that the assembly between the display screen and the fixing component 40 is accurate. When the aligning mark line 30 appears in the first image and does not coincide with the reference edge, it indicates that the display screen is shifted with respect to the fixing component 40 in the first direction. When the aligning mark line 30 does not appear in the first image, it indicates that the display screen is shifted with respect to the fixing component 40 in the second direction. Therefore, the shift direction may be intuitively determined based on whether or not the aligning mark line 30 appears in the first image, thereby making the shift judgment convenient.

As illustrated in FIG. 2 and FIG. 3, the second pixel region 20 may be disposed at a side of the first pixel region 10 to limit an adjusting direction of the display screen, and by using the shifted pixel row of the second pixel region 20 to substitute for the shifted pixel row of the first pixel region 10, the completeness of the display region of the display screen is ensured. When the first pixel region 10 is rectangular, the second pixel region 20 may also be disposed at more than one side of the first pixel region 10. For example, the second pixel region 20 may be disposed at two sides of the first pixel region 10 which are perpendicular or opposite to each other; the second pixel region 20 may be disposed at three consecutive sides of the first pixel region 10; or the second pixel region 20 may be disposed around the four sides of the first pixel region 10. As an example, the following illustrative description is made based on the case that the second pixel region 20 is disposed at two opposite sides of the first pixel region 10.

In some embodiments, the second pixel region 20 includes a third pixel region 21 and a fourth pixel region 22, which are disposed at two opposite sides of the first pixel region 10, respectively. A pixel row of the third pixel region 21 may be the same as or different from that of the fourth pixel region 22. When the first pixel region 10 is shifted towards the third pixel region 21 or the fourth pixel region 22, correction can be made at the third pixel region 21 or the fourth pixel region 22.

At the joint of the second pixel region 20 and the first pixel region 10, the aligning mark line 30 is provided for marking. When the second pixel region 20 includes the third pixel region 21 and the fourth pixel region 22, the aligning mark line 30 is provided at both a joint of the third pixel region 21 and the first pixel region 10 and a joint of the fourth pixel region 22 and the first pixel region 10. Specifically, the aligning mark line 30 includes a first mark line 31 at the joint of the third pixel region 21 and the first pixel region 10 and a second mark line 32 at the joint of the fourth pixel region 22 and the first pixel region 10.

The correction instruction is generated when it is detected according to the first image that the first mark line 31 and the second mark line 32 are shifted with respect to the fixing component 40. The first mark line 31 and the second mark line 32 are opposite to each other for marking the range of the third pixel region 21 and the fourth pixel region 22, respectively. Alternatively, the fixing component 40 includes a first reference line 41 corresponding to the first mark line 31 and a second reference line 42 corresponding to the second mark line 32.

A total screen resolution of the display screen is certain. When the display screen is not shifted, a distance between the first mark line 31 and the first reference line 41 is defined as a first distance, and a distance between the second mark line 32 and the second reference line 42 is defined as a second distance. When the display screen is shifted, an actual distance between the first mark line 31 and first reference line 41 has a first difference to the first distance, and an actual distance between the second mark line 32 and the second reference line 42 has a second difference to the second distance. When the first difference is positive, the second difference is negative; otherwise, when the first difference is negative, the second difference is positive. Alternatively, the first difference has an absolute value equal to that of the second difference.

In an alternative embodiment, the display screen is attached to a surface of the middle frame shell 50, the first pixel region 10 is bent at both ends of the middle frame shell 50, and the third pixel region 21 and the fourth pixel region 22 are fixed to the fixing component 40. As the first pixel region 10 has two bent parts, shift of the display region is easy to occur. However, by using a pixel row of the third pixel region 21 or the fourth pixel region 22 to substitute for a pixel row of a shifted part of the first pixel region 10, the completeness of the display region of the display screen may be ensured, and installation requirements of the display screen are lowered.

Figure 7:
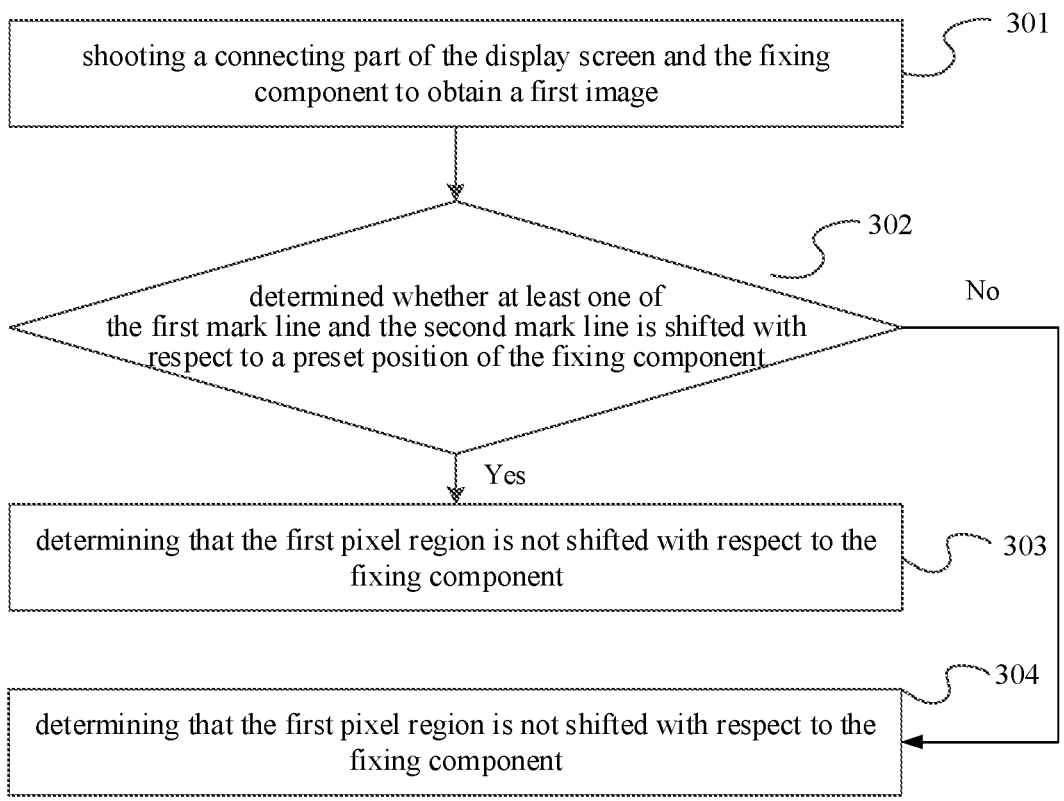
FIG. 7 is a flowchart of shift determination for some embodiments of the present disclosure where a second pixel region is disposed at both sides of a first pixel region.

As illustrated in FIG. 7, in some embodiments, the correction instruction is generated when it is detected according to the first image that the first mark line 31 and the second mark line 32 are shifted with respect to the fixing component 40, which process includes the following steps.

At step 301, a CCD captures a connecting part of the display screen and the fixing component 40 to obtain a first image.

At step 302, it is determined whether at least one of the first mark line 31 and the second mark line 32 is shifted with respect to a preset position of the fixing component 40.

At step 303, it is determined that the first pixel region 10 is not shifted with respect to the fixing component 40 when the first mark line 31 and the second mark line 32 are located at the preset position with respect to the fixing component 40.

At step 304, it is determined that the first pixel region 10 is shifted with respect to the fixing component 40 when at least one of the first mark line 31 and the second mark line 32 is not located at the preset position with respect to the fixing component 40.

The first mark line 31 and the second mark line 32 are set oppositely to each other for marking a first edge and a second edge of the first pixel region 10. When the display screen is assembled accurately, there are preset reference positions for the first mark line 31 and the second mark line 32 with respect to the fixing component 40. For example, the reference positions may be preset as a distance from the first mark line 31 to the first edge of the fixing component 40 and a distance from the second mark line 32 to the second edge of the fixing component 40, respectively. For example, the reference positions may be defined according to design requirements as n pixel row(s) of the first mark line 31 with respect to the first edge of the fixing component 40 and n pixel row(s) of the second mark line 32 with respect to the second edge of the fixing component 40, respectively, such as 0, 1, 2, 3, 5, or 10 pixel rows.

When the reference position of the first mark line 31 with respect to the first edge of the fixing component 40 is preset as 0 pixel row, a distance between the first mark line 31 and the second mark line 32 is equal to a width between the first edge and the second edge of the fixing member 40, i.e., the first mark line 31 is aligned with the first edge of the fixing component 40, and the second mark line 32 is aligned with the second edge of the fixing component 40, respectively. In this embodiment, both the first mark line 31 and the second mark line 32 are displayed on the first image, indicating that the display screen is not shifted. When only the first mark line 31 or the second mark line 32 can be seen in the first image, it indicates that the display screen is shifted.

When the first mark line 31 and the second mark line 32 are not located at the preset position with respect to the fixing component 40, the calibrating method further determines the shift direction of the display screen, which may be determined according to the distance change of the aligning mark line 30 with respect to the preset position of the fixing component 40.

Figure 6:
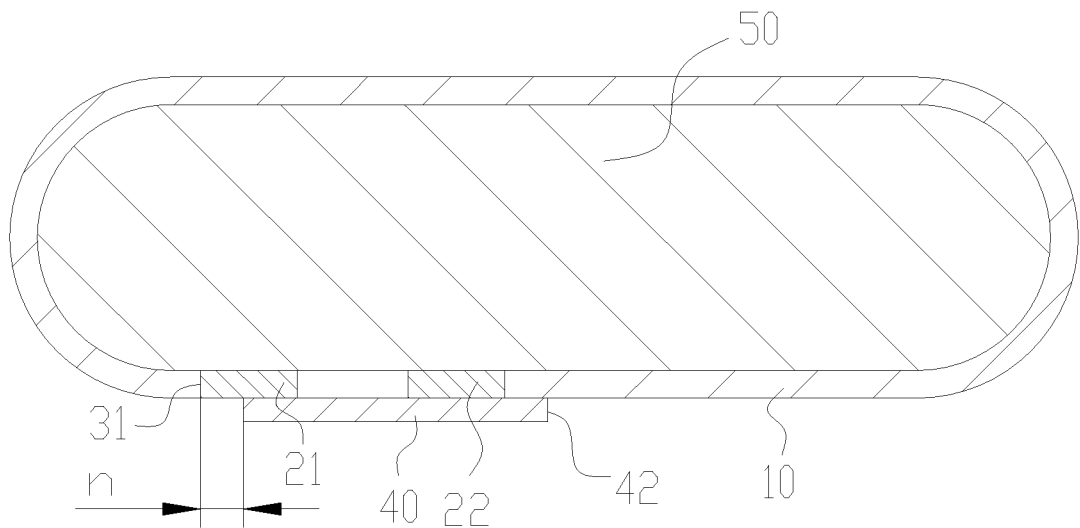
FIG. 6 is a schematic diagram showing that a display screen is attached to a middle frame shell and is shifted in a clockwise direction according to some embodiments of the present disclosure.

When a distance of the first mark line 31 with respect to the preset position of the fixing component 40 increases, it is determined that the first pixel region 10 is shifted in a clockwise direction, that is, the first mark line 31 is shifted away from the first reference line 41. For example, as illustrated in FIG. 3 and FIG. 6, the first mark line 31 shown in FIG. 3 is shifted to the left to a position shown in FIG. 6.

Figure 5:
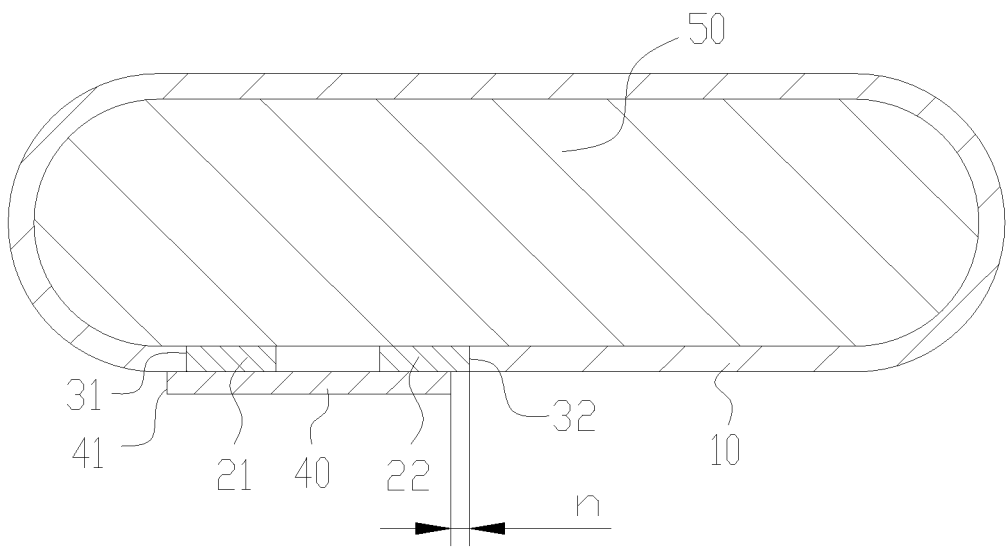
FIG. 5 is a schematic diagram showing that a display screen is attached to a middle frame shell and is shifted in a counterclockwise direction according to some embodiments of the present disclosure.

When a distance of the second mark line 32 with respect to the preset position of the fixing component 40 increases, it is determined that the first pixel region 10 is shifted in a counterclockwise direction, that is, the second mark line 32 is shifted away from the second reference line 42. For example, as illustrated in FIG. 3 and FIG. 5, the second mark line 32 shown in FIG. 3 is shifted to the right to a position shown in FIG. 5.

In some embodiments, the preset position of the first mark line 31 with respect to the fixing component 40 is 0 pixel row. When the first mark line 31 is displayed in the first image and has a first distance from the first edge of the fixing component 40, and the second mark line 32 is not displayed in the first image, it can be determined that the first pixel region 10 is shifted in the clockwise direction. When the first mark line 31 is not displayed in the first image, and the second mark line 32 is displayed in the first image and has a second distance from the second edge of the fixing component 40, it can be determined that the first pixel region 10 is shifted in the counterclockwise direction. Therefore, by observing the display situation of the first mark line 31 and the second mark line 32, the shift state of the display screen can be determined intuitively and conveniently.

After determining the shift direction of the display screen, the calibrating method of the present disclosure further determines an offset of the display screen by the following steps.

At step 401, it is determined that the distance of the first mark line 31 or the second mark line 32 with respect to the fixing component 40 is not equal to the preset value.

At step 402, an offset of the first mark line 31 or the second mark line 32 with respect to the fixing component 40 in the first image is measured. Such an offset may be acquired by a distance measurement in the first image via a built-in program of the calibrating apparatus.

At step 403, a value of pixel row of the third pixel region 21 or the fourth pixel region 22 to be activated and a value of pixel row of the first pixel region 10 to be deactivated are determined according to the offset. The values of pixel row corresponding to the offset may be acquired by the calibrating apparatus through calculation, and the calculation results are rounded.

For example, if only the first mark line 31 is displayed in the first image, while the second mark line 32 is covered, the first image shows an overall shift to the left (as shown in FIG. 6). The first mark line 31 and the first reference line 41 of the fixing component 40 are extracted from the first image, a distance between the first mark line 31 and the first reference line 41 is acquired by the built-in program, and based on the distance and the pixel size, the value of pixel row of the third pixel region 21 to be activated and the value of pixel row of the first pixel region 10 to be deactivated are calculated. For example, the calibrating apparatus generates a correction instruction that 3 pixel rows of the third pixel region 21 need to be activated and 3 pixel rows of the first pixel region 10 at the side of the fourth pixel region 22 need to be deactivated. The calibrating apparatus transmits the correction instruction to an IC chip (integrated circuit) of the display apparatus, and based on the correction instruction, the IC chip controls the corresponding pixel rows of the third pixel region 21 to be activated and the corresponding pixel rows of the first pixel region 10 to be deactivated, so as to adjust the display range of the display screen with a good correction effect.

In some embodiments, the display apparatus is corrected by the calibrating apparatus on the production line. The CCD captures the connecting part of the display screen and the fixing component 40 to obtain the first image, and the calibrating apparatus generates the correction instruction based on the first image and transmits the correction instruction to the IC chip of the display apparatus. Based on the correction instruction, the IC chip adjusts the display region by correcting and compensating the display screen.

For example, in a specific embodiment, the screen resolution is set to be 2340*1920, in which a display range of the first pixel region 10 is defined from $21^{th}$ to $2320^{th}$ pixel row, a range of the third pixel region 21 is defined from $1^{st}$ to $20^{th}$ pixel row, and a range of the fourth pixel region 22 is defined from $2321^{th}$ to $2340^{th}$ pixel row. That is, 20 pixel rows are added at each side of the first pixel region 10, and the size of each pixel row is 60 um. The first mark line 31 is marked at the $21^{th}$ pixel row, and the second mark line 32 is marked at the $2320^{th}$ pixel row.

As illustrated in FIG. 2, in an ideal situation, the installation between the display screen and the middle frame shell 50 is accurate, and all the longitudinal frame lines of the first pixel region 10 are normally displayed. Accordingly, the $(1^{st}, 20^{th})$ pixel rows of the third pixel region 21 and the $(2321^{th}, 2340^{th})$ pixel rows of the fourth pixel region 22 are all in the dormant state.

As illustrated in FIG. 6, when the display screen is shifted, the second mark line 32 for example is shifted clockwise and is covered by the fixing component 40, and the first mark line 31 is shifted clockwise to the left by the corresponding pixel row.

At this time, the first image acquired by the CCD shows an overall shift of n (n≥1) pixel row(s) in the clockwise direction. That is, the display range of the display screen is shifted from $(21^{th}, 2320^{th})$ pixel rows to $((21-n)^{th}, (2320-n)^{th})$ pixel rows. Therefore, the $((21-n)^{th}, (2320-n)^{th})$ pixel rows need to be activated, while the $(1^{st}, (20-n)^{th})$ pixel rows and the $((2321-n)^{th}, 2340^{th})$ pixel rows need to be deactivated. Based on the correction instruction, the IC chip makes compensations and corrects the display region of the display apparatus to be $((21-n)^{th}, (2320-n)^{th})$ pixel rows, while the $(1^{st}, (20-n)^{th})$ pixel rows and the $((2321-n)^{th}, 2340^{th})$ pixel rows are deactivated.

Similarly, as illustrated in FIG. 5, when the display screen is shifted counterclockwise, the first mark line 31 is shifted to the right and is covered by the fixing component 40, and the second mark line 32 is shifted to the right by the corresponding pixel row.

At this time, the first image acquired by the CCD shows an overall shift of n (n≥1) pixel row(s) in the counterclockwise direction. That is, the display range of the display screen is shifted from $(21^{th}, 2320^{th})$ pixel rows to $((21+n)^{th}, (2320+n)^{th})$ pixel rows. Therefore, the $((21+n)^{th}, (2320+n)^{th})$ pixel rows need to be activated, while the (1', (20+0B) pixel rows and the $((2321+n)^{th}, 2340^{th})$ pixel rows need to be deactivated. Based on the correction instruction, the IC chip makes compensations and corrects the display region of the display apparatus to be $((21+n)^{th}, (2320+n)^{th})$ pixel rows, while the $(1', (20+n)^{th})$ pixel rows and the $((2321+n)^{th}, 2340^{th})$ pixel rows are deactivated.

Corresponding to the above embodiments of the calibrating method, the present disclosure also provides embodiments of a calibrating apparatus based on the calibrating method. By applying the above calibrating method to the production line of the display apparatus, the display region of the display apparatus has a good display effect. The calibrating apparatus can be understood with reference to the embodiments of the above calibrating method.

The present disclosure further provides an apparatus for calibrating a display region of a display apparatus. The display apparatus includes a fixing component 40 and a display screen connected to the fixing component 40. The display screen includes a first pixel region 10 and a reserved second pixel region 20, and an aligning mark line 30 is provided at a joint of the first pixel region 10 and the second pixel region 20. The calibrating apparatus includes a capturing component and a controller. The capturing component is configured to capture a connecting part of the display screen and the fixing component 40 to obtain a first image. The controller is configured to determine whether the aligning mark line 30 is shifted with respect to the fixing component 40 according to the first image.

A correction instruction is generated when the aligning mark line 30 is shifted with respect to the fixing component 40. The correction instruction includes activating a pixel row of the second pixel region 20 where the aligning mark line 30 is shifted with respect to the fixing component 40 to substitute for a pixel row of the first pixel region 10 shifted to a connecting region of the fixing component 40.

The calibrating apparatus is set on the production line of the display apparatus for correcting the display region of the display apparatus. The calibrating apparatus is able to determine whether the display screen is shifted according to a fitting position between the display screen and the fixing component 40.

The display screen is fixed to the fixing component 40, so that the connecting part of the display screen and the fixing component 40 is fixed, and the aligning mark line 30 is fixed with respect to the connecting part of the fixing component 4. The calibrating apparatus may execute the calibrating method as described in any embodiment hereinbefore. The capturing component captures the connecting part of the display screen and the fixing component 40 through a capturing device to obtain the first image. The controller is able to acquire relative positions of the aligning mark line 30 and the fixing component 40 from the first image. For example, the capturing component is configured as a CCD micro camera, which captures the connecting part of the display screen and the fixing component 40 to obtain the first image correspondingly. When it is determined by the controller according to the first image that the aligning mark line 30 is shifted with respect to the fixing component 40, the controller generates a correction instruction accordingly. The correction instruction includes activating a pixel row of the second pixel region 20 where the aligning mark line 30 is shifted with respect to the fixing component 40 to substitute for a pixel row of the first pixel region 10 shifted to a connecting region of the fixing component 40, so as to make the display region of the display screen complete.

In some embodiments, the controller is configured to: determine a shift direction of the aligning mark line 30 with respect to the fixing component 40 and a first value of pixel row of the second pixel region 20 in the shift direction; and output a first value of pixel row of the second pixel region 20 to be activated and a first value of pixel row of the first pixel region 10 to be deactivated.

In some embodiments, the second pixel region 20 includes a third pixel region 21 and a fourth pixel region 22, which are disposed at two opposite sides of the first pixel region 10, respectively. The aligning mark line 30 includes a first mark line 31 at a joint of the third pixel region 21 and the first pixel region 10 and a second mark line 32 at a joint of the fourth pixel region 22 and the first pixel region 10. The correction instruction is generated when the controller detects according to the first image that the first mark line 31 and the second mark line 32 are shifted with respect to the fixing component 40.

In some embodiments, the controller is configured to: determine whether the first mark line 31 and the second mark line 32 are shifted with respect to a preset position of the fixing component 40; determine that the first pixel region 10 is not shifted with respect to the fixing component 40 when the first mark line 31 and the second mark line 32 are located at the preset positions with respect to the fixing component 40; determine that the first pixel region 10 is shifted with respect to the fixing component 40 when the first mark line 31 and the second mark line 32 are not located at the preset positions with respect to the fixing component 40.

In some embodiments, the controller is further configured to: determine that the first pixel region 10 is shifted in a clockwise direction when a distance of the first mark line 31 with respect to the preset position of the fixing component 40 increases; determine that the first pixel region 10 is shifted in a counterclockwise direction when a distance of the second mark line 32 with respect to the preset position of the fixing component 40 increases.

In some embodiments, the controller is further configured to: measure an offset of the first mark line 31 or the second mark line 32 with respect to the fixing component 40 in the first image; and determine according to the offset a value of pixel row of the third pixel region 21 or the fourth pixel region 22 to be activated and a value of pixel row of the first pixel region 10 to be deactivated.

The present disclosure further provides a method for calibrating a display region of a display apparatus, which receives the correction instruction output by the above method to calibrate the display region of the display apparatus, so as to make the display region of the display apparatus complete.

The calibrating method is used to adjust the display region of the display apparatus. The display apparatus includes a fixing component 40 and a display screen connected to the fixing component 40. The display screen includes a first pixel region 10 and a reserved second pixel region 20, and an aligning mark line 30 is provided at a joint of the first pixel region 10 and the second pixel region 20. The calibrating method includes steps as follows.

At step S501, the correction instruction output by the calibrating method as described in any embodiment hereinbefore is received.

At step S501, a pixel row of the second pixel region 20 where the aligning mark line 30 is shifted with respect to the fixing component 40 is activated according to the correction instruction to substitute for a pixel row of the first pixel region 10 shifted to a connecting region of the fixing component 40.

The display apparatus is configured with an IC chip for controlling the display of the display screen, and the IC chip corrects the display region of the display screen according to the received correction instruction, so as to make the display region of the display screen meet design requirements. In an initial state, the second pixel region 20 is in a dormant state and does not light up and emit light when not activated. In this step, the IC chip activates the pixel row of the second pixel region 20 where the aligning mark line 30 is shifted with respect to the fixing component 40 to substitute for the pixel row of the first pixel region 10 shifted to the connecting region of the fixing component 40, so as to make the display region of the display screen complete. That is, when the first pixel region 10 is shifted, the IC chip controls the pixel row of the first pixel region 10 shifted to a covering range of the fixing component 40 to enter the dormant state and controls the pixel row of the second pixel region 20 shifted out of the covering range of the fixing component 40 to enter an activated state, so as to make the display region meet design requirements.

At above step 502, the display apparatus activates the pixel row of the second pixel region 20 where the aligning mark line 30 is shifted with respect to the fixing component 40 according to the correction instruction to substitute for the pixel row of the first pixel region 10 shifted to the connecting region of the fixing component 40. In this step, according to the correction instruction, the display apparatus controls a first shifted pixel of the first pixel region 10 shifted to the connecting region of the fixing component 40 to enter the dormant state and controls a second shifted pixel of the second pixel region 20 shifted out of the connecting region of the fixing component 40 to enter an activated state. A value of pixel row of the first shifted pixel is equal to a value of pixel row of the second shifted pixel.

When the first pixel region 10 is shifted with respect to the fixing component 40, part of pixel rows of the first pixel region 10 shifted to the connecting region of the fixing component 40 is the value of pixel row of the first shifted pixel. Accordingly, the same number of pixel rows of the second pixel region 20 shifted out of the connecting region of the fixing component 40 with the shift of the first pixel region 10 is the value of pixel row of the second shifted pixel. As the number of pixel rows of the display screen is unchanged, the value of pixel row of the first shifted pixel is equal to the value of pixel row of the second shifted pixel. Therefore, the screen resolution of the display region of the display screen is unchanged, and the second shifted pixel is able to correct an image offset caused by the first shifted pixel, so that the display region of the display screen is always complete, and the display effect is good after correction.

For example, continue taking the above display screen with a screen resolution of 2340*1920 as an example. The display screen is attached to a middle frame shell 50, and ends of the display screen are fixed to the fixing component 40. The second pixel region 20 is distributed at a side of the first pixel region 10, and the other side of the first pixel region 10 is fixed to the fixing component 40 and is shifted towards the fixing component 40. The CCD captures an installation part of the display screen to obtain the first image. After calculation, a correction instruction is output, which includes a first shifted pixel of the first pixel region 10 having an offset of n pixel rows ($1 \leq n \leq 40$) and a second shifted pixel of the second pixel region 20 having an offset of n pixel rows towards the fixing component 40. Based on the correction instruction output by the calibrating apparatus, the display apparatus controls the first shifted pixel to enter the dormant state and controls the second shifted pixel to enter the activated stat, so that the display region of the display screen includes the second shifted pixel and the first pixel region 10 except the first shifted pixel.

As illustrated in FIG. 2 and FIG. 3, the present disclosure also provides a display apparatus, which uses the above calibrating method to correct the display region, so as to make the display region meet design requirements. The display apparatus includes a fixing component 40 and a display screen connected to the fixing component 40. The display screen includes a first pixel region 10 and a reserved second pixel region 20, and an aligning mark line 30 is provided at a joint of the first pixel region 10 and the second pixel region 20.

The display apparatus further includes a display controller. The display controller is configured to receive a correction instruction acquired by the above calibrating method, and to activate according to the correction instruction a pixel row of the second pixel region 20 where the aligning mark line 30 is shifted with respect to the fixing component 40 to substitute for a pixel row of the first pixel region 10 shifted to a connecting region of the fixing component 40.

The display screen includes the first pixel region 10 and the reserved second pixel region 20, in which the reserved second pixel region 20 is used as an extension part of the first pixel region 10. When processing the display apparatus, the second pixel region 20 is able to provide the first pixel region 10 with a reserved pixel row required for correction, which facilitates the correction of the display region of the display screen, makes the display region of the display screen complete, and improves the display effect of the display apparatus.

In an alternative embodiment, the first pixel region 10 is partially bent, and the second pixel region 20 is located at two ends of the first pixel region 10 and connected to the fixing component 40. The first pixel region 10 is configured as a main display part of the display screen. The first pixel region 10 may be partially bent, so that it can be made into display apparatuses like curved surface screens, 3D screens, etc. The second pixel region 20 is distributed at both ends of the first pixel region 10, so that correction can be made in any shift direction of the first pixel region 10, thereby reducing the difficulty of the fitting process of the display screen and keeping the display effect of the display apparatus stable.

Figure 8:
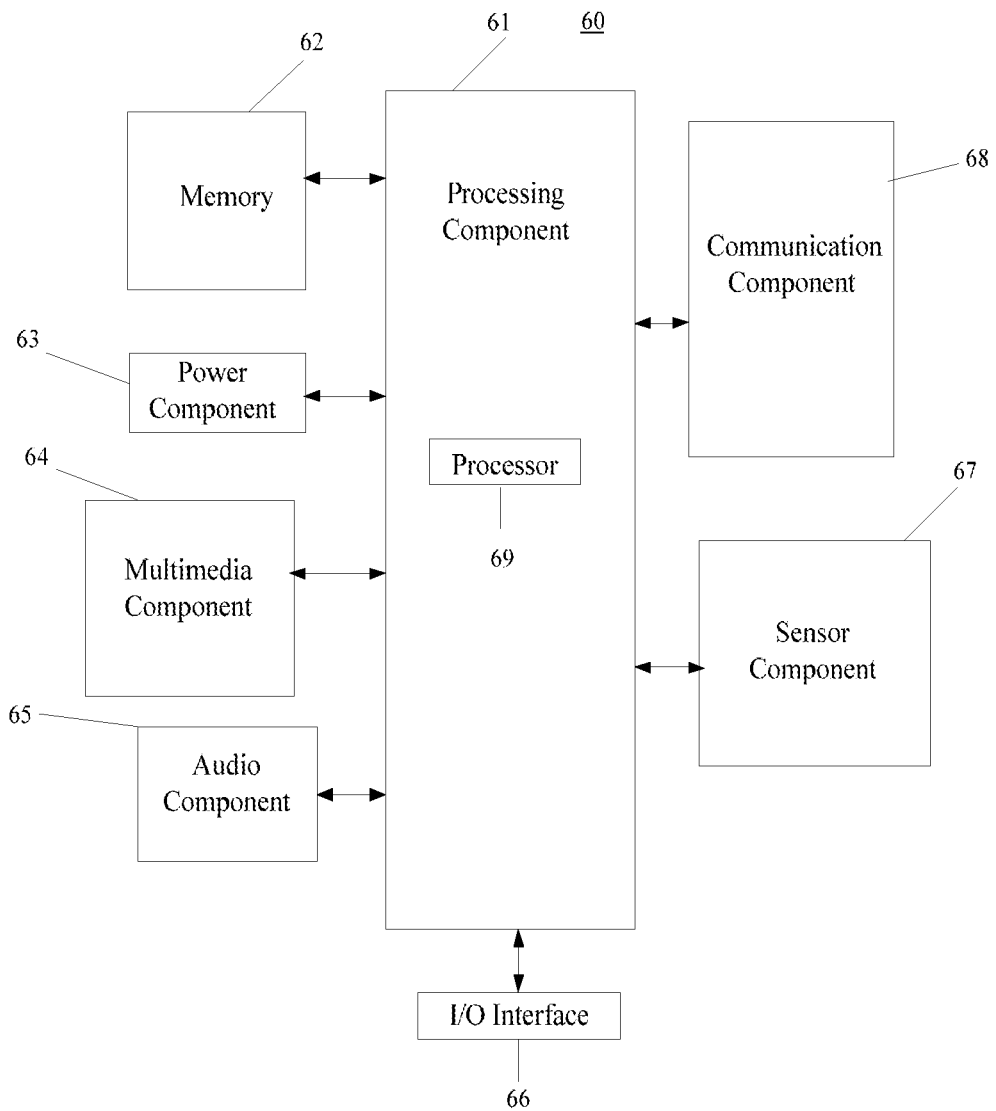
FIG. 8 is block diagram of a mobile terminal according to some embodiments of the present disclosure.

As illustrated in FIG. 8, the display apparatus as described in any above embodiment is applied to a mobile terminal, so as to make the display region of the mobile terminal in the center and make the correction of the display region convenient. In some embodiments, the mobile terminal includes a processor; a memory for storing instructions executable by the processor; a middle frame shell 50; and a display apparatus as described in any above embodiment. The fixing component 40 is installed on the middle frame shell 50, and the display screen is attached to a surface of the middle frame shell 50.

The mobile terminal may be set as different electronic devices. For example, the mobile terminal 60 may be a mobile phone, a computer, a digital broadcast terminal, a messaging device, a gaming console, a tablet, a medical device, exercise equipment, a personal digital assistant, a translator, and the like.

The mobile terminal 60 may include one or more of the following components: a processing component 61, a memory 62, a power component 63, a multimedia component 64, an audio component 65, an input/output (I/O) interface 66, a sensor component 67, and a communication component 68.

The processing component 61 typically controls overall operations of the mobile terminal 60, such as the operations associated with display, telephone calls, data communications, camera operations, and recording operations. The processing component 61 may include one or more processors 69 to execute instructions to perform all or part of the steps in the above described methods. Moreover, the processing component 61 may include one or more modules which facilitate the interaction between the processing component 61 and other components. For instance, the processing component 61 may include a multimedia module to facilitate the interaction between the multimedia component 64 and the processing component 61.

The memory 62 is configured to store various types of data to support the operation of the mobile terminal 60. Examples of such data include instructions for any applications or methods operated on the mobile terminal 60, contact data, phonebook data, messages, pictures, video, etc. The memory 62 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 63 provides power to various components of the mobile terminal 60. The power component 63 may include a power management system, one or more power sources, and any other components associated with the generation, management, and distribution of power in the mobile terminal 60.

The multimedia component 64 includes a screen providing an output interface between the mobile terminal 60 and the user. In some embodiments, the screen may include a liquid crystal display (LCD) and a touch panel (TP). In some embodiments, an organic light-emitting diode (OLED) display can be adopted.

If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 64 includes a front camera and/or a rear camera. The front camera and/or the rear camera may receive an external multimedia datum while the mobile terminal 60 is in an operation mode, such as a photographing mode or a video mode. Each of the front camera and the rear camera may be a fixed optical lens system or have focus and optical zoom capability.

The audio component 65 is configured to output and/or input audio signals. For example, the audio component 65 includes a microphone ("MIC") configured to receive an external audio signal when the mobile terminal 60 is in an operation mode, such as a call mode, a recording mode, and a voice recognition mode. The received audio signal may be further stored in the memory 62 or transmitted via the communication component 68. In some embodiments, the audio component 65 further includes a speaker to output audio signals.

The I/O interface 66 provides an interface between the processing component 61 and peripheral interface modules, such as a keyboard, a click wheel, buttons, and the like. The buttons may include, but are not limited to, a home button, a volume button, a starting button, and a locking button.

The sensor component 67 includes one or more sensors to provide status assessments of various aspects of the mobile terminal 60. For instance, the sensor component 67 may detect an open/closed status of the mobile terminal 60, relative positioning of components, e.g., the display and the keypad, of the mobile terminal 60, a change in position of the mobile terminal 60 or a component of the mobile terminal 60, a presence or absence of user contact with the mobile terminal 60, an orientation or an acceleration/deceleration of the mobile terminal 60, and a change in temperature of the mobile terminal 60. The sensor component 67 may include a proximity sensor configured to detect the presence of nearby objects without any physical contact. The sensor component 67 may also include a light sensor, such as a CMOS or CCD image sensor, for use in imaging applications. In some embodiments, the sensor component 67 may also include an accelerometer sensor, a gyroscope sensor, a magnetic sensor, a pressure sensor, or a temperature sensor.

The communication component 68 is configured to facilitate communication, wired or wirelessly, between the mobile terminal 60 and other devices. The mobile terminal 60 can access a wireless network based on a communication standard, such as Wi-Fi, 2G, 4G, or 5G, or a combination thereof. In one exemplary embodiment, the communication component 68 receives a broadcast signal or broadcast associated information from an external broadcast management system via a broadcast channel. In one exemplary embodiment, the communication component 68 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the mobile terminal 60 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

The above description includes part of embodiments of the present disclosure, and not limits the present disclosure. Any modifications, equivalent substitutions, improvements, etc., within the spirit and principles of the present disclosure, are included in the scope of protection of the present disclosure.

It is apparent that those of ordinary skill in the art can make various modifications and variations to the embodiments of the disclosure without departing from the spirit and scope of the disclosure. Thus, it is intended that the present disclosure cover the modifications and the modifications.

Various embodiments in this specification have been described in a progressive manner, where descriptions of some embodiments focus on the differences from other embodiments, and same or similar parts among the different embodiments are sometimes described together in only one embodiment.

It should also be noted that in the present disclosure, relational terms such as first and second, etc., are only used to distinguish one entity or operation from another entity or operation, and do not necessarily require or imply these entities having such an order or sequence. It does not necessarily require or imply that any such actual relationship or order exists between these entities or operations.

Moreover, the terms "include," "including," or any other variations thereof are intended to cover a non-exclusive inclusion within a process, method, article, or apparatus that comprises a list of elements including not only those elements but also those that are not explicitly listed, or other elements that are inherent to such processes, methods, goods, or device.

In the case of no more limitation, the element defined by the sentence "includes a . . . " does not exclude the existence of another identical element in the process, the method, or the device including the element.

Specific examples are used herein to describe the principles and implementations of some embodiments. The description is only used to help convey understanding of the possible methods and concepts. Meanwhile, those of ordinary skill in the art can change the specific manners of implementation and application thereof without departing from the spirit of the disclosure. The contents of this specification therefore should not be construed as limiting the disclosure.

For example, in the description of the present disclosure, the terms "some embodiments," or "example," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In the descriptions, with respect to circuit(s), unit(s), device(s), component(s), etc., in some occurrences singular forms are used, and in some other occurrences plural forms are used in the descriptions of various embodiments. It should be noted; however, the single or plural forms are not limiting but rather are for illustrative purposes. Unless it is expressly stated that a single unit, device, or component etc. is employed, or it is expressly stated that a plurality of module, devices or components, etc. are employed, the circuit(s), unit(s), device(s), component(s), etc. can be singular, or plural.

Based on various embodiments of the present disclosure, the disclosed apparatuses, devices, and methods can be implemented in other manners. For example, the abovementioned devices can employ various methods of use or implementation as disclosed herein.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

Dividing the device into different "regions," "module," "components" or "layers," etc. merely reflect various logical functions according to some embodiments, and actual implementations can have other divisions of "regions," "module," "components" or "layers," etc. realizing similar functions as described above, or without divisions. For example, multiple regions, module, or layers, etc. can be combined or can be integrated into another system. In addition, some features can be omitted, and some steps in the methods can be skipped.

Those of ordinary skill in the art will appreciate that the module, components, regions, or layers, etc. in the devices provided by various embodiments described above can be provided in the one or more devices described above. They can also be located in one or multiple devices that is (are) different from the example embodiments described above or illustrated in the accompanying drawings. For example, the module, regions, or layers, etc. in various embodiments described above can be integrated into one module or divided into several sub-modules.

The various device components, modules, module, blocks, or portions may have modular configurations, or are composed of discrete components, but nonetheless can be referred to as "modules" in general. In other words, the "components," "modules," "blocks," "portions," or "module" referred to herein may or may not be in modular forms, and these phrases may be interchangeably used.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

The order of the various embodiments described above are only for the purpose of illustration, and do not represent preference of embodiments.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to the disclosed aspects of the exemplary embodiments can be made in addition to those described above by a person of ordinary skill in the art having the benefit of the present disclosure without departing from the spirit and scope of the disclosure contemplated by this disclosure and as defined in the following claims. As such, the scope of this disclosure is to be accorded the broadest reasonable interpretation so as to encompass such modifications and equivalent structures.

The invention claimed is:

1. A method for calibrating a display region of a display apparatus, wherein the display apparatus comprises a fixing component, and a display screen connected to the fixing component, the display screen comprises a first pixel region and a reserved second pixel region, and an aligning mark line is provided at a joint of the first pixel region and the second pixel region, the second pixel region comprises a third pixel region and a fourth pixel region at two opposite sides of the first pixel region, respectively, and the aligning mark line comprises a first mark line at a joint of the third pixel region and the first pixel region and a second mark line at a joint of the fourth pixel region and the first pixel region, wherein the method comprises:
capturing a connecting part of the display screen and the fixing component to obtain a first image;
determining whether at least one of the first mark line and the second mark line is shifted with respect to the fixing component according to the first image; and
generating a correction instruction when it is detected according to the first image that at least one of the first mark line and the second mark line is shifted with respect to the fixing component, wherein the correction instruction comprises activating a pixel row of the second pixel region where the aligning mark line is shifted with respect to the fixing component to substitute for a pixel row of the first pixel region shifted to a connecting region of the fixing component, wherein the generating the correction instruction when it is detected according to the first image that at least one of the first mark line and the second mark line is shifted with respect to the fixing component comprises:
determining whether at least one of the first mark line and the second mark line is shifted with respect to a preset position of the fixing component;
determining that the first pixel region is not shifted with respect to the fixing component when the first mark line and the second mark line are located at the preset position with respect to the fixing component;
determining that the first pixel region is shifted with respect to the fixing component when at least one of the first mark line and the second mark line is not located at the reset position with respect to the fixing component, wherein when at least one of the first mark line and the second mark line is not located at the reset position with respect to the fixing component, the method further comprises:

determining that the first pixel region is shifted in a clockwise direction when a distance of the first mark line with respect to the preset position of the fixing component increases;
determining that the first pixel region is shifted in a counterclockwise direction when a distance of the second mark line with respect to the preset position of the fixing component increases.

2. The method according to claim 1, wherein the generating a correction instruction comprises:
determining a shift direction of the aligning mark line with respect to the fixing component and a first value of pixel row of the second pixel region in the shift direction; and
outputting a first value of pixel row of the second pixel region to be activated and a first value of pixel row of the first pixel region to be deactivated.

3. The method according to claim 1, wherein when the first mark line and the second mark line are not located at the preset position with respect to the fixing component, the method further comprises:
measuring an offset of the first mark line or the second mark line with respect to the fixing component in the first image; and
determining according to the offset a value of pixel row of the third pixel region or the fourth pixel region to be activated and a value of pixel row of the first pixel region to be deactivated.

4. The method according to claim 1, further comprising:
receiving the correction instruction; and
activating according to the correction instruction the pixel row of the second pixel region where the aligning mark line is shifted with respect to the fixing component to substitute for the pixel row of the first pixel region shifted to the connecting region of the fixing component.

5. The method according to claim 4, wherein the activating according to the correction instruction the pixel row of the second pixel region where the aligning mark line is shifted with respect to the fixing component to substitute for the pixel row of the first pixel region shifted to the connecting region of the fixing component comprises:
deactivating a first shifted pixel of the first pixel region shifted to the connecting region of the fixing component and activating a second shifted pixel of the second pixel region shifted out of the connecting region of the fixing component according to the correction instruction, wherein a value of pixel row of the first shifted pixel is equal to a value of pixel row of the second shifted pixel.

6. The method according to claim 4, wherein the first pixel region is partially bent.

7. An apparatus for calibrating a display region of a display apparatus, wherein the display apparatus comprises a fixing component, and a display screen connected to the fixing component, the display screen comprises a first pixel region and a reserved second pixel region, and an aligning mark line is provided at a joint of the first pixel region and the second pixel region, the second pixel region comprises a third pixel region and a fourth pixel region at two opposite sides of the first pixel region, respectively, and the aligning mark line comprises a first mark line at a joint of the third pixel region and the first pixel region and a second mark line at a joint of the fourth pixel region and the first pixel region, wherein the apparatus comprises:
a capturing component, configured to capture a connecting part of the display screen and the fixing component to obtain a first image; and
a controller, configured to determine whether at least one of the first mark line and the second mark line is shifted with respect to the fixing component according to the first image, and to generate a correction instruction when at least one of the first mark line and the second mark line is shifted with respect to the fixing component,
wherein the correction instruction comprises activating a pixel row of the second pixel region where the aligning mark line is shifted with respect to the fixing component to substitute for a pixel row of the first pixel region shifted to a connecting region of the fixing component,
wherein the controller is configured to:
determine whether at least one of the first mark line and the second mark line is shifted with respect to a preset position of the fixing component;
determine that the first pixel region is not shifted with respect to the fixing component when the first mark line and the second mark line are located at the preset position with respect to the fixing component;
determine that the first pixel region is shifted with respect to the fixing component when at least one of the first mark line and the second mark line is not located at the reset position with respect to the fixing component,
wherein the controller is further configured to:
determine that the first pixel region is shifted in a clockwise direction when a distance of the first mark line with respect to the preset position of the fixing component increases;
determine that the first pixel region is shifted in a counterclockwise direction when a distance of the second mark line with respect to the preset position of the fixing component increases.

8. The apparatus according to claim 7, wherein the controller is configured to:
determine a shift direction of the aligning mark line with respect to the fixing component and a first value of pixel row of the second pixel region in the shift direction; and
output a first value of pixel row of the second pixel region to be activated and a first value of pixel row of the first pixel region to be deactivated.

9. The apparatus according to claim 7, wherein the controller is further configured to:
measure an offset of the first mark line or the second mark line with respect to the fixing component in the first image; and
determine according to the offset a value of pixel row of the third pixel region or the fourth pixel region to be activated and a value of pixel row of the first pixel region to be deactivated.

10. A display apparatus, comprising:
a fixing component;
a display screen, connected to the fixing component and comprising a first pixel region and a reserved second pixel region, and an aligning mark line being provide at a joint of the first pixel region and the second pixel region; and
a display controller, configured to receive a correction instruction generated with the method according to claim 1, and to activate according to the correction instruction a pixel row of the second pixel region where the aligning mark line is shifted with respect to the fixing component to substitute for a pixel row of the first pixel region shifted to a connecting region of the fixing component.

11. The display apparatus according to claim 10, wherein the first pixel region is partially bent, and the second pixel region is located at two ends of the first pixel region and connected to the fixing component.

12. A mobile terminal calibrated with the method according to claim 1, comprising:
the fixing component; and
the display screen connected to the fixing component,
wherein the display screen comprises:
the first pixel region; and
the reserved second pixel region;
wherein:
the aligning mark line is provided at the joint of the first pixel region and the second pixel region; and
the second pixel region is configured as an extension region of the display screen reserved for the first pixel region to be activated in part to substitute for the shifted pixel row of the first pixel region upon a fitting deviation occurs to the first pixel region, thereby improving adjusting effect of the display region and display effect, and reducing requirements to a fitting process of the display screen.

13. The mobile terminal according to claim 12, wherein the display screen comprises a foldable organic light-emitting diode (OLED) screen.

14. A calibrating apparatus implementing the method according to claim 1, comprising a charge coupled device (CCD) camera configured to capture the connecting part of the display region and the fixing component to obtain the first image.

* * * * *